United States Patent

Umeda et al.

[11] Patent Number: 5,291,345
[45] Date of Patent: Mar. 1, 1994

[54] APPARATUS FOR APPLYING MAGNETIC FIELD AND MAGNETO-OPTICAL DISK STORAGE HAVING SUCH APPARATUS

[75] Inventors: Yoshiaki Umeda; Hiroo Shimegi; Manabu Ogura, all of Amagasaki; Akira Nikaido, Tachikawa; Fumio Sakamoto, Machida; Shigeharu Honda, Shibuya, all of Japan

[73] Assignees: Mitsubishi Electric Corp.; TEAC Corporation, Japan

[21] Appl. No.: 733,100

[22] Filed: Jul. 19, 1991

[30] Foreign Application Priority Data

Jul. 20, 1990 [JP] Japan ................... 2-192488

[51] Int. Cl.$^5$ .................. G11B 5/02; G11B 5/127
[52] U.S. Cl. ....................... 360/59; 360/114; 369/13; 365/122
[58] Field of Search ............. 360/59, 114, 66; 369/13, 126; 365/122

[56] References Cited

U.S. PATENT DOCUMENTS

| 4,748,606 | 5/1988 | Naito et al. | 369/13 |
| 4,962,492 | 10/1990 | Mathildus et al. | 369/13 |
| 5,020,042 | 5/1991 | Fearnside et al. | 369/13 |

FOREIGN PATENT DOCUMENTS 63-266602 11/1988 Japan .

Primary Examiner—Robert J. Pascal
Assistant Examiner—Ali Neyzari
Attorney, Agent, or Firm—Andrus, Sceales, Starke & Sawall

[57] ABSTRACT

An apparatus for applying a magnetic field has a permanent magnet, pivotally supported, which has an approximate cylindrical shape, respective semicircles of a circular section thereof being magnetized as N and S poles, and a driving coil, located in the vicinity of the permanent magnet so that the permanent magnet can partially penetrate inside the loops of the driving coil, the rotation and the positioning of the permanent magnet being controlled by the strength and/or directions of current flow in the driving coil. The apparatus is used for a magneto-optical disk storage. Since the driving coil is close to the permanent magnet, the pivoting of the permanent magnet can be controlled with a fast response. In addition, the apparatus can be made relatively small.

17 Claims, 9 Drawing Sheets

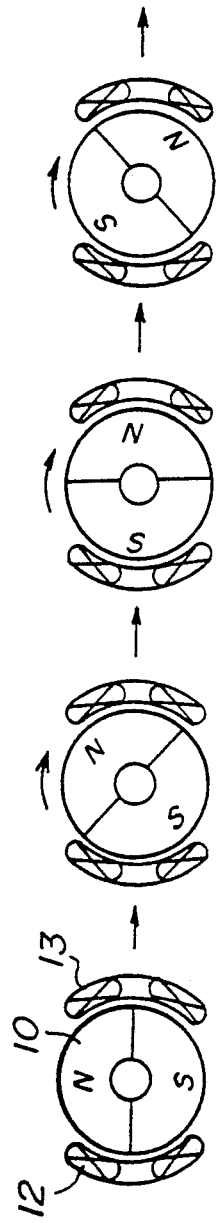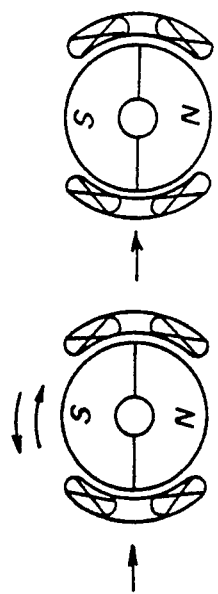

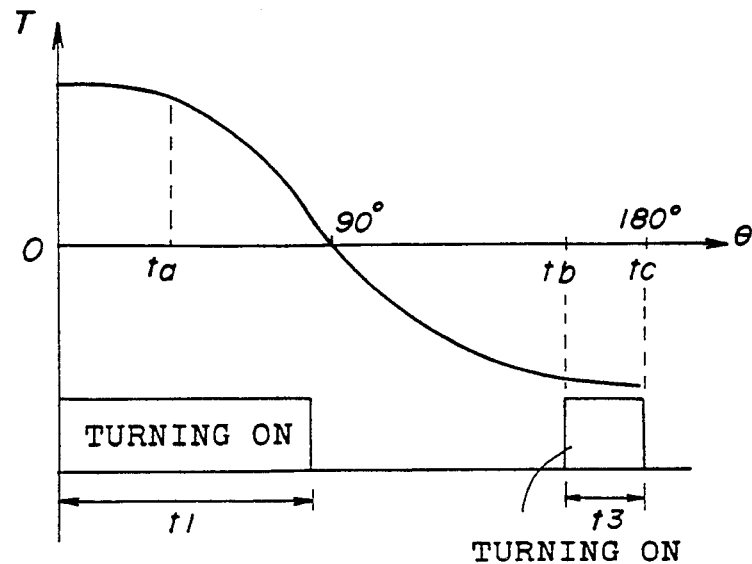
FIG.8A
FIG.8B
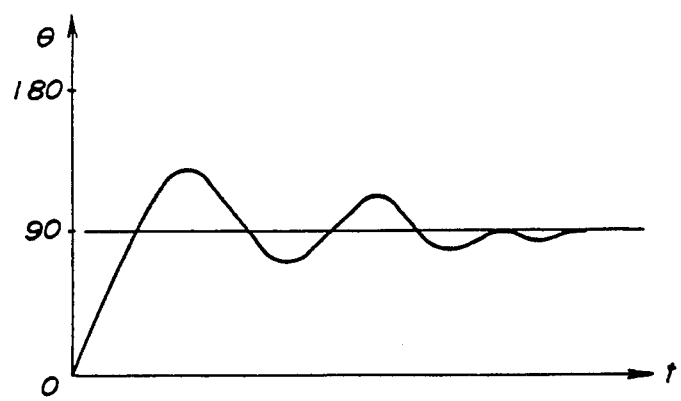
FIG.9

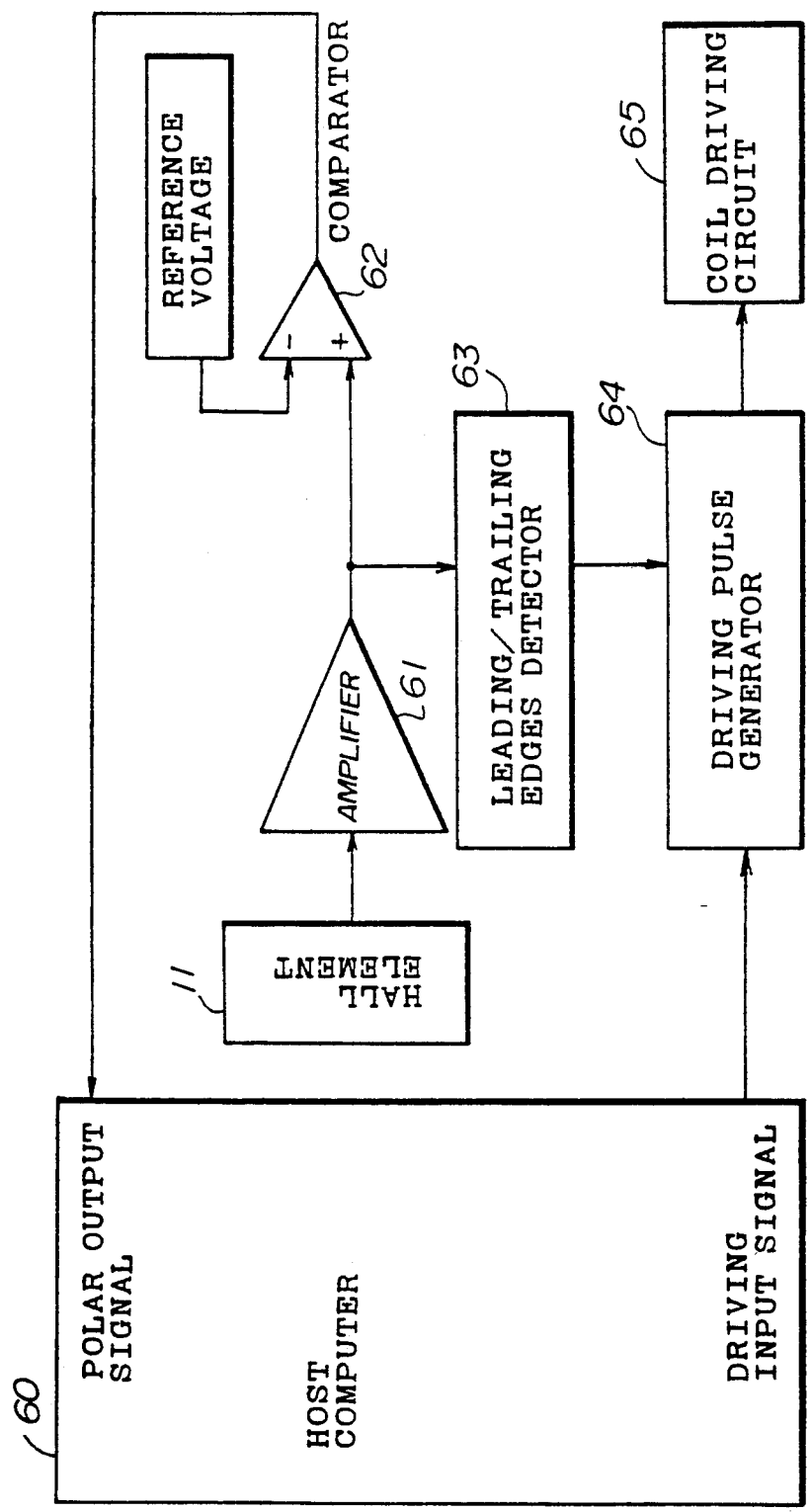

FIG.11A DRIVING INPUT SIGNAL

FIG.11B DRIVING PULSE

FIG.11C HALL ELEMENT $V_s$

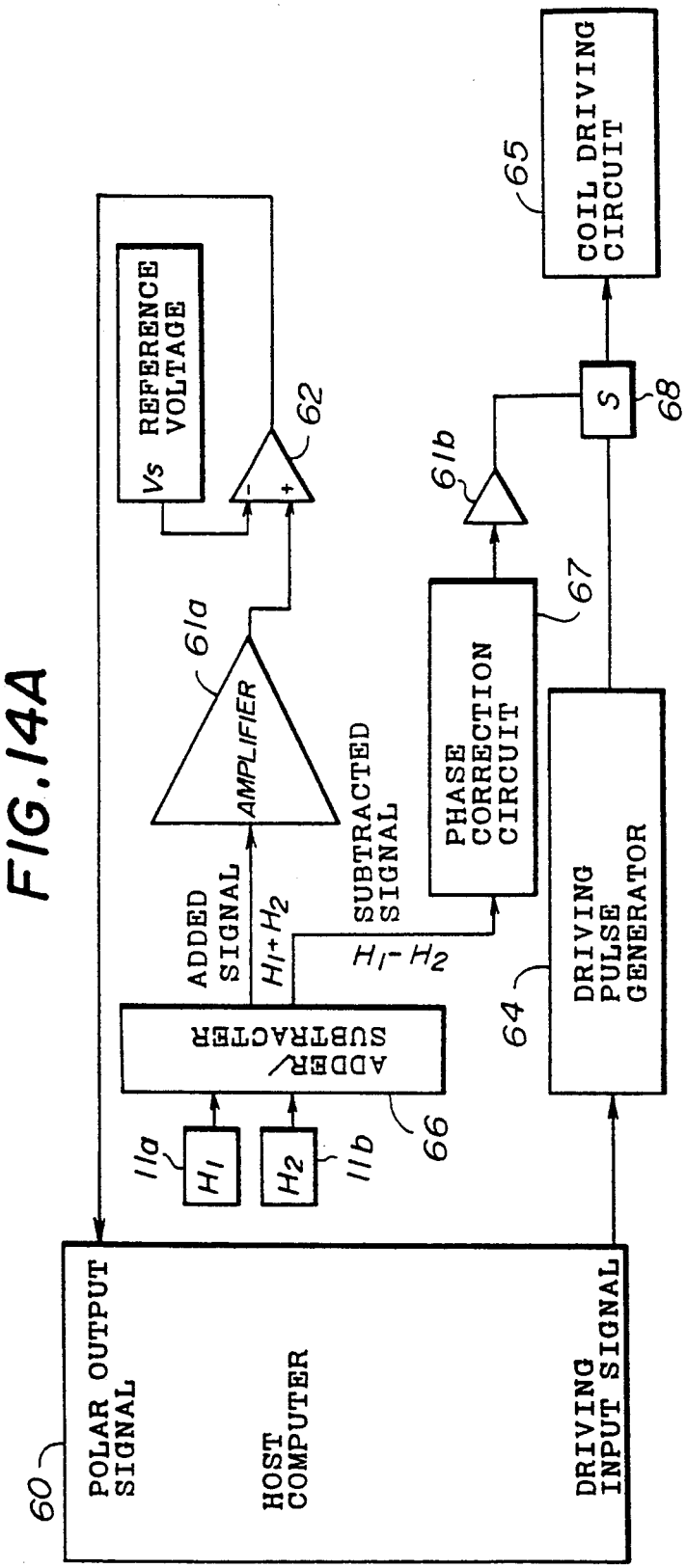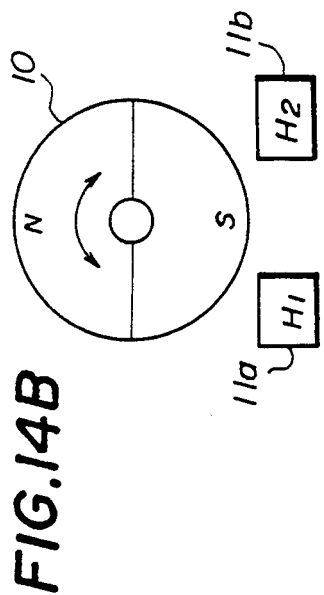

APPARATUS FOR APPLYING MAGNETIC FIELD AND MAGNETO-OPTICAL DISK STORAGE HAVING SUCH APPARATUS

BACKGROUND OF THE INVENTION

The present invention relates generally to an apparatus for applying a magnetic field to a recording surface of a magneto-optical disk in order to record/erase information thereon/from, and a magneto-optical disk storage having such an apparatus.

In magneto-optical recording, it is necessary to locally heat up a magneto-optical disk by a laser beam to reverse the magnetization while a coercive force Hc is being applied. Hereupon, Japanese Laid-Open Utility Model Application No. 64-42503 has disclosed an apparatus for applying a bias magnetic field, which is the coercive field Hc, to a recording surface of a magneto-optical disk by reversing a permanent magnet in magneto-optical recording/erasing. The apparatus comprises, as shown in FIG.1, a permanent magnet 1, a pair of driving coils 2 and 3, a support plate 5 and a magnetic field detecting means 6. The permanent magnet 1 applies a bias magnetic field, which is the coercive field Hc, to the recording surface 101 of the magneto-optical disk 102. The permanent magnet 1 is flat, located parallel to the recording surface 101, and pivotally supported via an axis 4. The driving coils 2 and 3 are symmetrically located with respect to the axis 4, and are respectively located on the support plate 5 parallel to the recording surface 101. The magnetic field detecting means 6 comprises a hall element. The optical head 103 is located opposite to the apparatus on the other side of the magneto-optical disk 102. When the driving coils 2 and 3 are simultaneously electrified in a direction $i_1$ or $i_2$ the apparent magnetic poles, generated on the center lines thereof, pull and repel the magnetic poles of the permanent magnet. Thus, the permanent magnet 1 can be controlled to be rotated by the direction of the current $i_1$ or $i_2$. Since the driving coils 2 and 3 are located on the same plane symmetrically with respect to the axis 4, the rotating control of the permanent magnet 1 can be stabilized.

However, the above conventional apparatus has following disadvantages.

1. Since the driving coils 2 and 3 are located in parallel, the apparatus cannot be miniaturized, and thus the apparatus cannot be used for an magneto-optical disk smaller than 3.5 in.

2. Since the magnetic poles of the permanent magnet 1 are too far from the apparent magnetic poles, the rotating of the permanent magnet 1 cannot be controlled with a response time of less than 10 ms. That is, as shown in FIG.2B, if the current is turned off after the driving coils 2 and 3 are electrified and thus the permanent magnet 1 is reversed, the permanent magnet 1 traces a damped oscillation curve shown in FIG.2A so that a settling time takes more than 15 Ms. Hereupon, the term "a settling time", as used herein, means the time for the permanent magnet 1 to reverse and halt.

SUMMARY OF THE INVENTION

Accordingly, it is a general object of the present invention to provide an apparatus for applying a magnetic field to a magneto-optical disk and a magneto-optical disk storage having such an apparatus, in which the above disadvantages are eliminated.

Another object of the present invention is to provide an apparatus for applying a magnetic field to a magneto-optical disk, which is smaller and more responsive than a conventional one, and a magneto-optical disk storage having such an apparatus.

According to one feature of the present invention, an apparatus for applying a magnetic field comprises a permanent magnet, pivotally supported, which has an approximate cylindrical shape, respective semicircles of a circular section thereof being magnetized as N and S poles, and a driving coil, located in the vicinity of the permanent magnet so that the permanent magnet can partially penetrate inside the loops of the driving coil, the rotation and the positioning of the permanent magnet being controlled by the strength and/or directions of current through the driving coil.

According to another feature of the present invention, a magneto-optical disk storage comprises an apparatus for applying a magnetic field comprising a permanent magnet, pivotally supported, which applies a magnetic field to a recording surface of a magneto-optical disk, the permanent magnet having an approximate cylindrical shape, respective semicircles of a circular section thereof being magnetized as N and S poles, and a driving coil, located in the vicinity of the permanent magnet so that the permanent magnet can partially penetrate inside the loops of the driving coil, the rotation and the positioning of the permanent magnet being controlled by the strength and/or directions of current through the driving coil, and an optical head which locally radiates a laser beam onto the recording surface of the magneto-optical disk.

According to the present invention, since the cylindrical permanent magnet is closer to the driving coil, the apparatus can be made smaller and more responsive than the conventional one. Incidentally, the permanent magnet is halted quickly if the current is made to flow in the driving coil, when the permanent magnet is inclined by a predetermined angle, so that a torque can be applied to the permanent magnet in a direction opposite to a rotating direction thereof.

Other objects and further features of the present invention will become apparent from the following detailed description when read in conjunction with the accompanying drawings.

BRIEF DESCRIPTION OF THE DRAWINGS

FIGS. 7A through 7F show views for explaining an operation of the permanent magnet when the driving coils shown in FIG.5 are respectively electrified;

FIGS. 8A and 8B show a timing chart for explaining a relationship between the rotating angle of the permanent magnet shown in FIG.7 and the torque applied thereto and between the rotating angle thereof and the current through the driving coils;

FIG.9 shows a view for explaining an operation of the permanent magnet shown in FIG.7 in which the rotating angle thereof exceeds 90° while the driving coils are being electrified;

FIG.10 shows an example of a circuitry block diagram in order to obtain the timing chart shown in FIG.8;

FIGS. 11A through 11D show a timing chart for explaining an operation of the control circuit shown in FIG.10;

FIG.14A shows another block diagram different from that shown FIG.10; and

FIG.14B shows a relationship between hall elements shown in FIG.14A and the permanent magnet.

DESCRIPTION OF THE PREFERRED EMBODIMENTS

Figure 1:
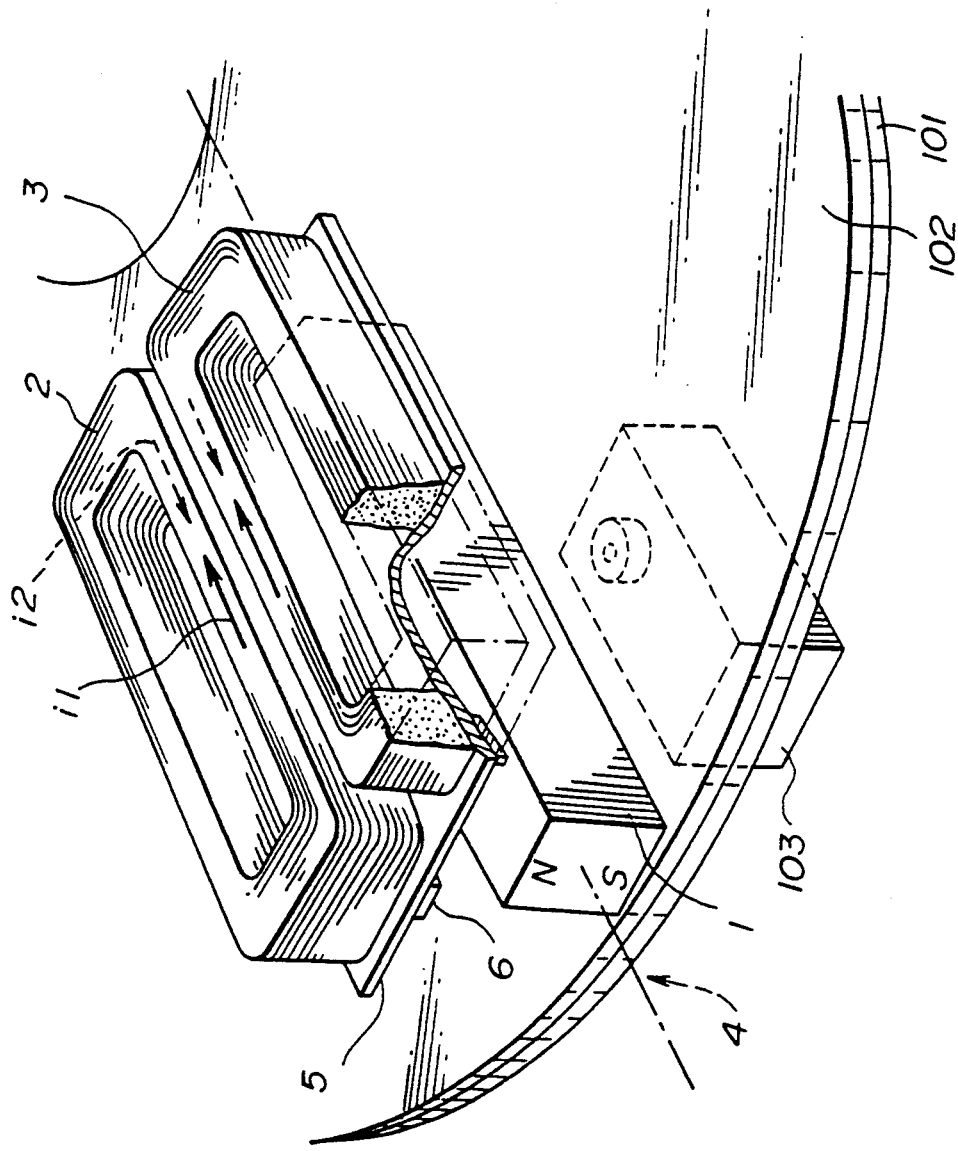
FIG.1 shows a principal perspective view of a conventional apparatus for applying a magnetic field.
Figure 2:
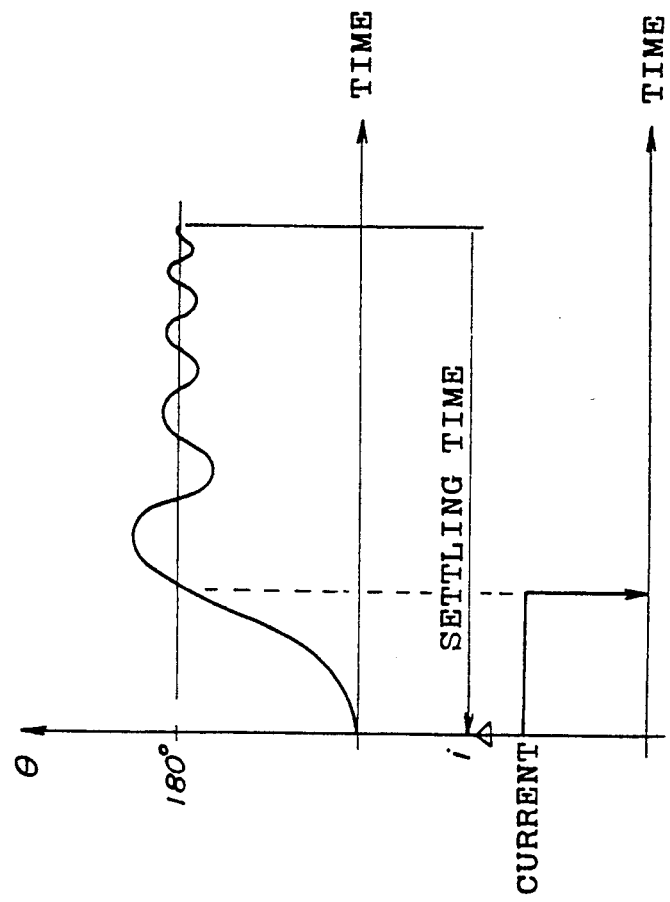
FIGS. 2A and 2B show a timing chart for explaining a conventional operation of a permanent magnet.
Figure 3:
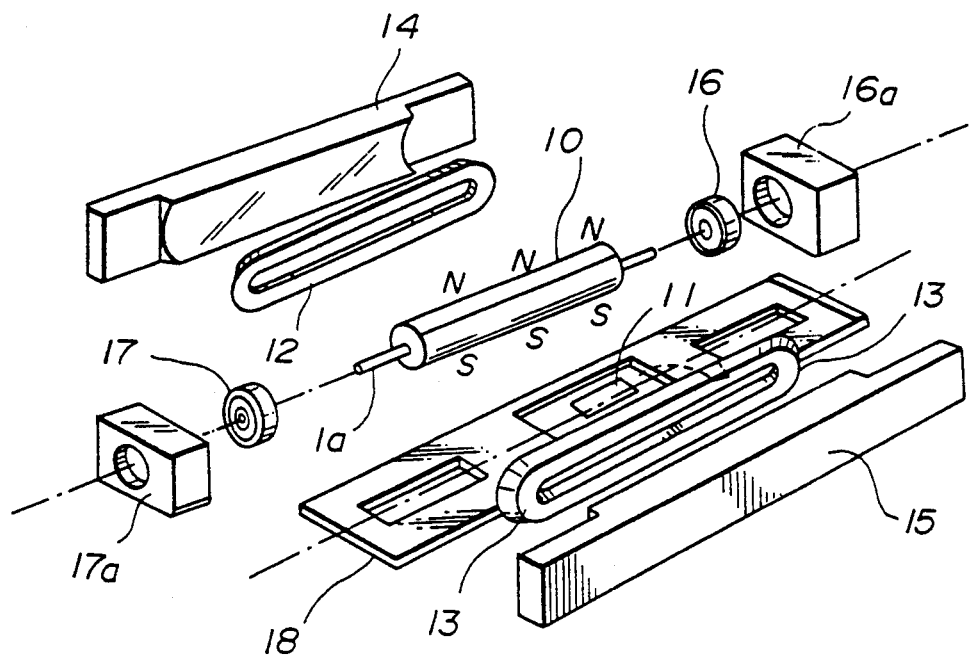
FIG.3 shows a perspective view of a disassembled apparatus for applying a magnetic field according to the present invention.
Figure 4:
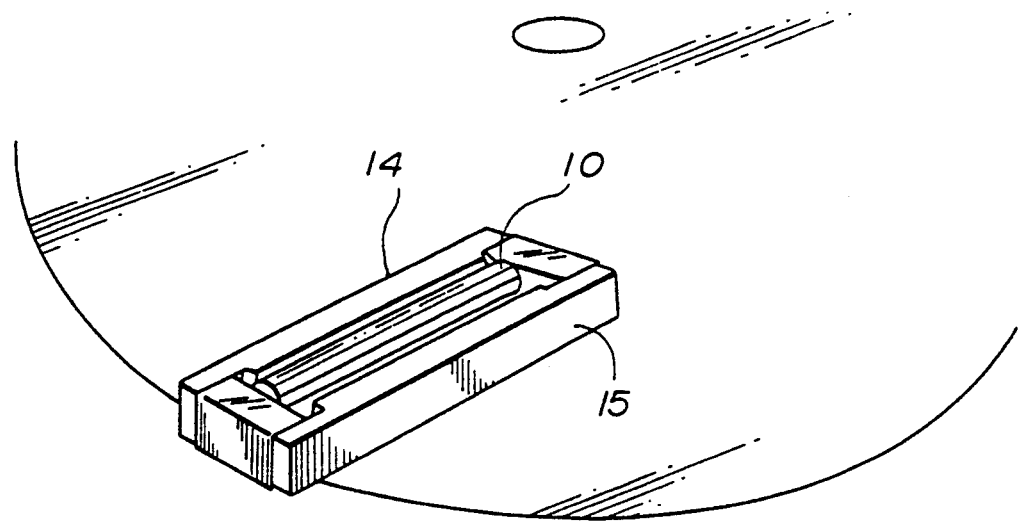
FIG.4 shows a perspective view of the assembled apparatus shown in FIG.3.
Figure 5:
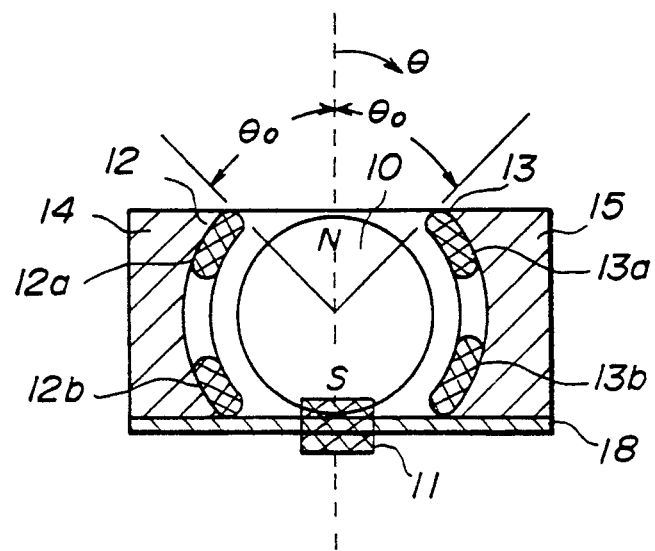
FIG.5 shows a sectional view of the apparatus shown in FIG.4.

The apparatus for applying a magnetic field according to the present invention comprises, as shown in FIGS.3 to 5, an axle 1a, a permanent magnet 10, a hall element 11, a pair of driving coils 12 and 13, a pair of coil holders 14 and 15, a pair of bearings 16 and 17, a pair of bearing supports 16a and 17a and a support plate 18. The axle 1a passes through the permanent magnet 10 in a longitudinal direction thereof. The bearings 16 and 17 are engaged with both sides of the axle 1a, and the bearings 16 and 17 are inlaid in the corresponding bearing supports 16a and 17a. The driving coil 12 is engaged with the coil holder 14, and the driving coil 13 is engaged with the coil holder 15. The permanent magnet 10 is located between the driving coils 12 and 13. The driving coils 12 and 13, coil holders 14 and 15, and bearing supports 16a and 17a are mounted on the support plate 18. The hall element 11 is located in and supported by the support plate 18.

The permanent magnet 10 has an approximate cylindrical shape, and respective diametrically opposite half cylinders are magnetized with an S pole and an N pole. The permanent magnet 10 is pivotally supported by the bearings 16 and 17 and bearing supports 16a and 17a. The axle 1a, parallel to the recording surface of the magneto-optical disk, passes through axis of the cylindrically shaped permanent magnet 10.

The hall element 11 is a kind of a magnetic sensor which detects a hall angle as the rotating angle of the permanent magnet 10. Incidentally, the magnetic sensor used for the apparatus according to the present invention is not limited, needless to say, to a hall element.

The support plate 18, extending parallel to the axle 1a, has a rectangular shape and pivotally holds the permanent magnet 10. Thus, the permanent magnet 10 applies the bias magnetic field, which is a coercive field Hc, vertically to the recording surface of the magneto-optical disk. The support plate 18 has three openings in the longitudinal direction, and the hall element 11 is inserted in the middle opening thereof. The support plate 18 comprises, for example, an iron plate.

The driving coils 12 and 13 respectively bend so as to be parallel to the circumference of the sectional circle of the permanent magnet 10. The driving coils 12 and 13 respectively extend along the longitudinal direction of the permanent magnet 10. The number of turns of the driving coils 12 and 13 and the distances between the permanent magnet 10 and the driving coils 12 and 13 are determined so that the permanent magnet 10 is partially inserted into the apertures of the driving coils 12 and 13. In this embodiment, the driving coil 12 and 13 respectively have the same number of turns "n". Since the driving coils 12 and 13 are respectively apart from the permanent magnet 10, the rotating of the permanent magnet 10 is not prevented. The driving coils 12 and 13 are located, as shown in FIG.5, diametrically opposite each other with respect to the permanent magnet and in a plane parallel to the Y-axis which passes through the center of the permanent magnet 10 and extends perpendicular to the support plate 18. Incidentally, unlike this embodiment, any number of driving coils may be provided. The driving coils 12 and 13 respectively have pitch directions approximately corresponding to the axis of the cylinder of the permanent magnet 10. The coil holders 14 and 15 respectively have curved portions corresponding to the bending of the driving coils 12 and 13, and are engaged with the driving coils 14 and 15 via the curved portions. When the current i flows in the driving coils 12 and 13, the apparent magnetic poles are generated at the center of the aperture of the driving coils 12 and 13, so that the permanent magnet 10 rotates. The torque to be applied to the permanent magnet 10 depends on the strength, direction of the current i and the rotating angle $\theta$ of the permanent magnet 10. Hereupon, the term "driving coil side", as used herein, means one of the sides of the driving coils 12a, 12b, 13a and 13b.

As shown in FIG.5, if the rotating angle $\theta$ of the permanent magnet is initialized from the Y-axis and each position of the driving coils 12 and 13 is indicated by an angle $\theta_0$, a torque $T_{12}$ which is applied to the permanent magnet 10 by the driving coil 12 becomes $T_{12} = Ki \cos(\theta + \theta_0)$ and a torque $T_{13}$ which is applied to the permanent magnet 10 by the driving coil 13 becomes $T_{13} = Ki \cos(\theta - \theta_0)$. Therefore, the total torque to be applied to the permanent magnet 10 is indicated as follows.

$$T = T_{12} + T_{13} = Ki[\cos(\theta + \theta_0) + \cos(\theta - \theta_0)]$$
$$= Ki * 2 * \cos(2\theta/2) * \cos(2\theta_0/2) = 2Ki * \cos\theta_0 \cos\theta$$

Hereupon, $K = n\Phi$, $\Phi$ is a magnetic flux of the driving coil side.

Figure 6:
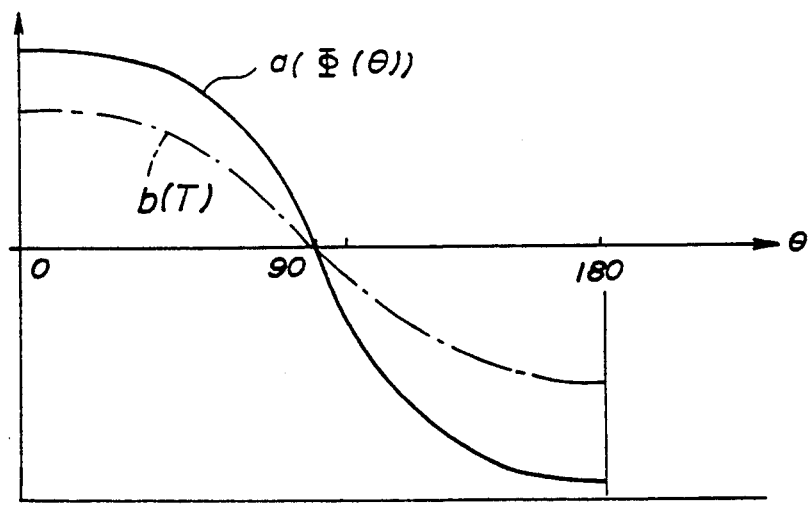
FIG.6 shows a relationship between a torque applied to a permanent magnet shown in FIG.5 and a rotating angle of the permanent magnet.

The graph a of FIG. 6 shows of magnetic flux $\Phi(\theta)$ versus rotating angle $\theta$ of the permanent magnet 10 generated by the driving coil side. The torque T to be applied to the permanent magnet 10 is shown by graph b. of FIG. When the torque T is positive, the rotating force is applied to the permanent magnet 10, and when the torque T is negative, the halting force is applied thereto. The torque T is positive until the rotating angle $\theta$ becomes 90°. If the current i flows in the driving coils 12 and 13, the magnetic flux $\Phi$ and the torque T respectively become 0 when the rotating angle $\theta$ is 90°. However, because of the force of inertia, the permanent magnet 10 continues to rotate. When the rotating angle $\theta$ becomes 90°, the torque T becomes negative and the permanent magnet 10 begins to decelerate. The halting force caused by the torque T is maximized when the rotating angle $\theta$ becomes 180°. When the hall element 11 detects that the permanent magnet 10 has reversed, the driving coils 12 and 13 respectively stop being electrified.

A description will now be given of the operation of the permanent magnet when the driving coils 12 and 13 are respectively electrified.

The rotating angle $\theta$ of the permanent magnet 10 is initially 0° where i=0, as shown in FIG.7A. If the current i flows, the permanent magnet 10 begins to rotate, as shown in FIG.7B. The torque T then is given by $t_a$ shown in FIG.8A. As shown in FIG.7C, when the rotating angle $\theta$ becomes nearly 90°, the current i is turned off, as shown in FIG.8B. If the driving coils are continuously electrified, the permanent magnet 10 is halted by the negative torque T, as shown in FIG.9. Accordingly, an electrifying time period $t_1$ is a time in which the rotating angle $\theta$ becomes 90°. The permanent magnet 10 rotates because of the angular momentum after the current i is turned off.

When a predetermined time has passed after the current i is turned off, the permanent magnet 10 rotates to a position shown in FIG.7D. Then the current i flows in the same direction as that in the FIG.7B for a period $t_b - t_c$ in FIG.8A in order to apply the negative torque to the permanent magnet 10. As shown in FIG.7E, when the permanent magnet 10 rotates 180° from a position shown in FIG.7A, the current i is turned off and the permanent magnet 10 is stabilized at a position shown in FIG.7F. The torque T then is given by the $t_c$ shown in FIG.8A. Now that the magnetization of the magneto-optical disk is reversed, information can be recorded/erased thereon/therefrom.

A description will now be given of the construction of a control circuit which controls the supplying the current i shown in FIG.8. The control circuit comprises, as shown in FIG.10, a hall element 11, a host computer 60, an amplifier 61, a comparator 62, a leading/trailing edges detector 63, a driving pulse generator 64 and a coil driving circuit 65. The control circuit is located within the magneto-optical disk storage and it is coupled to the apparatus for applying the magnetic field responsive to the hall element 11 and the coil driving circuit 65. The host computer 60 is coupled to the driving pulse generator 64. The hall element 11 is coupled to the input of the amplifier 61. The output of the amplifier 61 is coupled to the plus terminal of the comparator 62 and the input of the leading/trailing edges detector 63. Reference voltage Vs is applied to the minus terminal of the comparator 62. The output of the leading/trailing edges detector 63 is connected to the driving pulse generator 64. The output of the comparator 62 is coupled to the host computer 60.

The leading/trailing edges detector 63 detects the leading edge or trailing edge of the output of the hall element 11. The driving pulse generator 64 outputs the driving pulse to the coil driving circuit 65 in response to the driving input signal output from the host computer 60. The coil driving circuit 65 drives the driving coils 12 and 13 which are provided therein.

A description will now be given of the operation of the control circuit. First, the host computer 60 supplies the driving input signal shown in FIG.11A to the driving pulse generator 64. Responsive thereto, the driving pulse generator 64 outputs the driving pulse shown in FIG.11B to the coil driving circuit 65. Incidentally, the driving pulse may be generated by establishing the pulse-width of the driving input signal as $t_1$.

The output of the hall element 11 is supplied to the comparator 62 via the amplifier 61 in order to be compared with the reference voltage Vs. If the output of the hall element 11 is higher than the reference voltage Vs, the output of the comparator 62 becomes high level (1), however if less, if becomes low level (0). Because of this output of the comparator 62, the position of the permanent magnet 10 can be judged. That is, for example, it may be judged that the S pole of the permanent magnet 10 is lowered, as shown in FIG.7A, if the output of the comparator 62 becomes high level (1) while the N pole of the permanent magnet 10 is lowered, as shown in FIG.7F, if the output of the comparator 62 becomes low level (0). The comparator 62 outputs a binary output signal indicating the polarity of the permanent magnet 10 to the host computer 60.

Figure 11D:
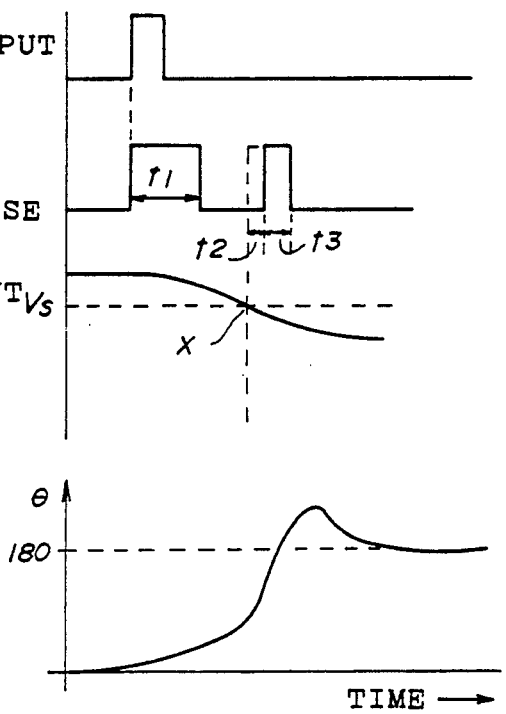

The output of the hall element 11 is supplied to the leading/trailing edges detector 63 via the amplifier 61 so as to detect the leading edge and the trailing edge. The leading/trailing edges detector 63 supplies the detecting signal to the driving pulse generator 64 when it detects the timing in which the rotating angle $\theta$ reaches approximately 90°, which timing is given by "x" in FIG.11C. Responsive to the detecting signal, the driving pulse generator 64 outputs the driving pulse to the coil driving circuit 65 for a period $t_2 - t_3$. Times $t_1$, $t_2$ and $t_3$ can be experimentally determined. FIG.11C shows a polarity of the permanent magnet 10 detected by the hall element 11, and the polarity of the permanent magnet 10 is reversed at the time "x".

In response to the driving pulse, the coil driving circuit 65 supplies the current shown to the driving coils 12 and 13 in order to apply the torque to the permanent magnet 10 in FIG.7D in the same direction as that shown in FIG.7B.

Figure 12:
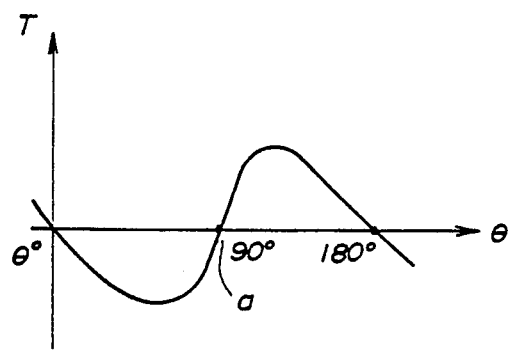
FIG.12 shows a view for explaining a torque which stabilizes the permanent magnet shown in FIG.5.

Next, a description will now be given of the response of the permanent magnet 10 with reference to FIG.12. Incidentally, the Y-axis indicates the torque T, and the X-axis indicates the rotating angle $\theta$. A point "a" in FIG.12 is a turning point where the rotating angle reaches approximately 90° and the polarity of the permanent magnet 10 changes. The point where the rotating angle $\theta$ is 0° in FIG.12 corresponds to a state shown in FIG.7A, and the point "a" corresponds to a state shown in FIG.7C. If the rotating angle $\theta$ is increased, the torque T which becomes negative is applied to the permanent magnet 10, as shown in FIG.12. Since the torque T moves the permanent magnet 10 from a state shown in FIG.7D to a state shown in FIG.7F, the time required for reversing and halting of the permanent magnet 10 can be shortened. In an experiment, the settling time in the range of 7 ms to 10 ms could be obtained.

Incidentally, a circuit shown in FIG.14A may be substituted for the control circuit shown in FIG.10. The control circuit shown in FIG.14A comprises two hall elements 11a and 11b, two amplifiers 61a and 61b, an adding/subtracting circuit 66, a phase correction circuit 67 and a switch 68. Those elements which are the same as corresponding elements in FIG.10 are designated by the same reference numerals, and a description will be omitted.

As shown in FIG.14B, the adding/subtracting circuit 66 adds and subtracts the outputs of the hall elements 11a and 11b with each other. The added signal is supplied to the plus terminal of the comparator 62 via the amplifier 61a, and the subtracted signal is supplied to the coil driving circuit 65 via the phase correction circuit 67 and the amplifier 61b. Incidentally, the same reference voltage Vs in FIG.10 may be used by adjusting the amplification factor of the amplifier 61a. The subtracted signal represents the rotating angle θ of the permanent magnet 10. The subtracted signal is supplied to the phase correction circuit 67, and thus the frequency characteristic of the signal is changed thereby. The output of the phase correction circuit 67 is supplied to the amplifier 61b. The output of the amplifier 61b is supplied to the coil driving circuit 65 via the switch 68. The output of the driving pulse generator 64 is supplied to the coil driving circuit 65 via the switch 68. The switch 68 generally transmits the output of the amplifier 61b to the coil driving circuit 65, however the switch 68 transmits the output of the driving pulse generator 64 to the coil driving circuit 65 by interrupting the transmitting from the amplifier 61b to the coil driving circuit 65 if the output of the driving pulse generator 64 is supplied to the switch 65. After the output of the driving pulse generator 64 is completely supplied to the coil driving circuit 65, the switch 68 again transmits the output of the amplifier 61b to the coil driving circuit 65. The coil driving circuit 65 electrifies current proportional to the subtracted signal to the driving coils. Thus, the permanent magnet 10 is fixed by means of a position feedback control always except when it is reversed, which control uses a control current caused by a subtracted signal proportional to the changing of the rotating angle of the permanent magnet 10.

Figure 13:
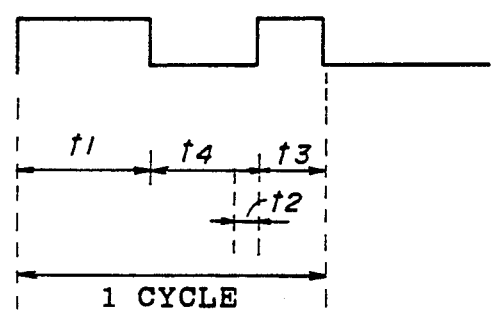
FIG.13 shows a pulse train after a driving input signal is input from the host computer shown in FIG.10.

In addition, as shown in FIG.13, a pulse train sequence which is generated by combining the widths $t_1$ to $t_4$ may be used.

Thus, according to the present invention, since the driving coil is located in the vicinity of the permanent magnet, the apparatus can be made smaller. In addition, the permanent magnet can quickly respond while the current flow in the driving coil is made relatively small. Moreover, since the permanent magnet is decelerated and halted by the current which causes the negative torque, the permanent magnet can be halted in a relatively short time.

Further, the present invention is not limited to those preferred embodiments, but various variations and modifications may be made within the scope of the present invention.

What is claimed is:

1. An apparatus for providing a magnetic field of either polarity comprising:
    a permanent magnet having an approximately cylindrical shape, said permanent magnet being pivotally supported along its axis, respective semicircular portions of the circular section of the permanent magnet being magnetized as north and south poles, said permanent magnet having a pair of opposing arcuate sides defined by a diameter of said circular section; and
    a driving coil having a pair of spaced, loop portions positioned proximate to the exterior of said permanent magnet, each of said loop portions being positioned proximate the same side of said permanent magnet, the spacing of the loop portions being such that the arcuate distance from one loop portion to a corresponding point on the other loop portion along the circumference of said permanent magnet is less than 180°, said coil being formed such that a portion of said permanent magnet is embraced by said coil, the rotation and positioning of said permanent magnet, and hence the magnetic field provided by said apparatus, being controlled by one of the strength and direction of the current flowing in said drive coil.

2. An apparatus according to claim 1, wherein said driving coil extends approximately parallel to the axis of said cylindrical shape of said permanent magnet.

3. An apparatus according to claim 1, wherein said permanent magnet is pivotally supported by an axle which passes through a center of the circular section thereof and extends perpendicular to said circular section, and said driving coil is arcuately formed and has a rectangular chord-like imaginary surface parallel to the axis extending between said loop portions, said permanent magnet partially penetrating said imaginary surface.

4. An apparatus according to claim 1, wherein said apparatus comprises a pair of driving coils arranged symmetrically with each other with respect to a center of the circular section of said permanent magnet.

5. A magneto-optical disk storage means comprising:
    an apparatus for providing a magnetic field of either polarity comprising:
        a permanent magnet which applies a magnetic field to a recording surface of a magneto-optical disk, the permanent magnet having an approximately cylindrical shape, said permanent magnet being pivotally supported along its axis, respective semicircular portions of the circular section of the permanent magnet being magnetized as north and south poles, said permanent magnet having a pair of opposing arcuate sides defined by a diameter of said circular section;
        a driving coil having a pair of spaced, loop portions positioned proximate to the exterior of said permanent magnet, each of said loop portions being positioned on the same side of said permanent magnet, the spacing of the loop portions being such that the arcuate distance from one loop portion to a corresponding point on the other loop portion along the circumference of said permanent magnet is less than 180°, said coil being formed such that a portion of said permanent magnet is embraced by said coil, the rotation and positioning of said permanent magnet, and hence the magnetic field provided by said apparatus, being controlled by one of the strength and direction of the current flowing in said driving coil; and
    an optical head which locally radiates a laser beam onto the recording surface of the magneto-optical disk.

6. A magneto-optical disk storage means according to claim 5, wherein the permanent magnet is pivotally supported by an axle which passes through a center of the circular section, thereof and extends perpendicular to said circular section the axis being parallel to the recording surface of the magneto-optical disk.

7. A magneto-optical disk storage means according to claim 5, wherein said magneto-optical disk storage means comprises:
    angle directing means, coupled to said apparatus, for detecting a pivoting angle of the permanent magnet; and
    control means for controlling the current to be supplied to the driving coil based on the pivoting angle of the permanent magnet.

8. A magneto-optical disk storage means according to claim 7, wherein said control means comprises decelerating means for supplying the current to the driving coil so that a torque in a direction opposite to a rotating direction of the permanent magnet can be applied to the permanent magnet when the pivoting angle reaches a predetermined angle.

9. A magneto-optical disk storage means according to claim 7, wherein the angle detecting means comprises a magnetic sensor which detects a hall angle generated by a permanent magnet.

10. A magneto-optical disk storage means according to claim 8, wherein the decelerating means is further defined as commencing the supply of current when the pivoting angle of the permanent magnet becomes approximately 90°.

11. A magneto-optical disk storage means according to claim 5, wherein said magneto-optical disk storage further comprises a servocircuit which stably positions the permanent magnet when it is not rotating.

12. A magneto-optical disk storage means according to claim 7, wherein said control means comprises a servocircuit which stably positions the permanent magnet when it is not rotating.

13. A magneto-optical disk storage unit comprising:
a pivotally supported permanent magnet, said permanent magnet having portions magnetized as north and south poles for applying a magnetic field of either polarity to a magneto-optic disk, the magnetic field being perpendicular to a recording surface of said magneto-optic disk;
a driving coil located in the vicinity of said permanent magnet for electromagnetically engaging said permanent magnet;
control means, coupled to said driving coil, for providing current pulses to said driving coil so that said permanent magnet is rotated by said electromagnetic engagement; and
servo circuit means, coupled to said control means, for energizing said driving coil to maintain said permanent magnet stopped at a predetermined position when said permanent magnet is not being rotated by the current pulses from said control means.

14. A magneto-optical disk storage unit as claimed in claim 13, wherein said servo circuit means has detection means for detecting an angular displacement of the permanent magnet, said servo circuit means maintaining said permanent magnet stopped at the predetermined position with reference to an angular displacement detected by said detection means.

15. A magneto-optical disk storage unit as claimed in claim 14, wherein said detection means has a magnetic sensor for detecting a Hall angle corresponding to an angular displacement of said permanent magnet.

16. A magneto-optical disk storage unit comprising:
a pivotally supported permanent magnet, said permanent magnet having portions magnetized as north and south poles for applying a magnetic field of either polarity to a magneto-optic disk, the magnetic field being perpendicular to a recording surface of said magneto-optic disk;
a driving coil located in the vicinity of said permanent magnet for electromagnetically engaging said permanent magnet;
control means, coupled to said driving coil, for providing a current pulse to said driving coil so that said permanent magnet is rotated by said electromagnetic engagement;
detection means for detecting an angular displacement of the permanent magnet; and
braking means, coupled to said control means, for supplying a current pulse to said driving coil for a predetermined time period when an angular displacement detected by said detection means reaches a predetermined value, so that said permanent magnet experiences a torque in a direction opposite to a direction in which said permanent magnet is being rotated to bring the permanent magnet to a desired position.

17. A magneto-optical disk storage unit as claimed in claim 16, wherein said detection means has a magnetic sensor for detecting a Hall angle corresponding to an angular displacement of said permanent magnet.

* * * * *

UNITED STATES PATENT AND TRADEMARK OFFICE
CERTIFICATE OF CORRECTION

PATENT NO. : 5,291,345
DATED : March 1, 1994
INVENTOR(S) : Umeda et al

It is certified that error appears in the above-indentified patent and that said Letters Patent is hereby corrected as shown below:

CLAIM 7, Col. 8, Line 59, delete "directing" and substitute therefor ---detecting---

Signed and Sealed this

Sixth Day of September, 1994

Attest:

BRUCE LEHMAN

Attesting Officer    Commissioner of Patents and Trademarks